United States Patent [19]

Thorpe

[11] Patent Number: 5,276,865
[45] Date of Patent: Jan. 4, 1994

[54] AUTOMATIC COMPUTER BACK-UP SYSTEM

[76] Inventor: Tracy J. Thorpe, 2173 Valleydale La., Encinitas, Calif. 92024

[21] Appl. No.: 879,956

[22] Filed: May 6, 1992

[51] Int. Cl.⁵ .................................................. G06F 11/00
[52] U.S. Cl. ................................. 395/575; 395/750; 364/273
[58] Field of Search ............... 395/750, 375; 364/268.1, 268.2, 273, 273.4, 273.5

[56] References Cited

U.S. PATENT DOCUMENTS 4,868,832  9/1989  Marrington et al. ............... 364/200
4,907,150  3/1990  Arroyo et al. ...................... 364/200

OTHER PUBLICATIONS

Advanced Microprocessors by Daniel Tabak ©1991 by McGraw-Hill, Inc. pp. 44, 160–163.
Structured Computer Organization Third Edition by Andrew S. Tanenbaum ©1990 by Prentice-Hall Inc. pp. 126–128.
The 8086/8088 Family: Design, Programming and Interfacing by John Uffenbeck, Prentice-Hall Inc. ©1987, pp. 263–265.

*Primary Examiner*—Vincent P. Canney
*Attorney, Agent, or Firm*—Nydegger & Associates

[57] ABSTRACT

A backup device and method for automatically backing up the memory of a computer. The device is installed inline between the electrical outlet and the computer, and also inline between the keyboard and computer. The user initiates a backup/powerdown routine by moving a switch on the device to "off". This in turn disables the keyboard and sends a keycode string from the device to the computer to begin execution of a previously specified backup routine. When the backup is completed, the device de-energizes a relay in the power line to the computer which powers down the computer.

21 Claims, 5 Drawing Sheets

AUTOMATIC COMPUTER BACK-UP SYSTEM

TECHNICAL FIELD

The present invention pertains to a device and method for automatically backing up the memory of a computer. More particularly, the present invention relates to a device which backs up and powers down a computer when the computer user turns off the computer. The present invention is particularly, but not exclusively, useful for performing a memory backup and computer powerdown when prompted to powerdown by the user of the computer.

BACKGROUND OF THE INVENTION

Computers universally require memory for storing programs and data. This memory can be in several locations and comes in several different types. The most commonly used types of computer memory are floppy disks and hard drive disks. Both of these are magnetically sensitive media which are moved past a head which is generally able to read and write magnetic information on the disks. Each of the respective types of disks has advantages and disadvantages. Floppy disks are readily transportable and are therefore easily moved from machine to machine. Their principle drawback is that they typically do not hold a great deal of information. Hard disks, on the other hand, tend to be more fixed, but can hold a great deal of information. A common drawback of both disks is that the information they contain is relatively fragile. This fragility results from the ability of the media and its information to be overwritten and the susceptibility of the media to be altered if exposed to magnetic fields.

As a result of this fragility, it is commonly recommended that computer users make a copy of their programs and data and store them in a separate location. This process of copying to a second location is commonly referred to as backing up, and the resulting copy is referred to as a backup. Should the primary storage media fail, the user simply makes a copy of the backup and rewrites his primary storage media. This is commonly referred to as restoring a drive or disk. From the forgoing, it is clear that the restored copy will fail to restore work since the last backup. In other words, the longer the time interval between backing up and restoring, the greater the amount of data that will be lost. Accordingly, there is a great incentive to ritualistically perform backups, and to do them often.

Performing a backup generally requires that the computer user manually instruct the computer to make copies of selected programs and data. Furthermore, the user must specify locations where the copies are to be located. If a large amount of data must be backed up, then floppy disks are not the preferred backup media. In this situation, a tape drive is often used. Alternatively, the copies are located on a second hard drive disk. A tape drive is also a magnetic media and usually uses magnetic cassettes that are interchangeable. By using a tape drive or a second hard drive, the entire backup can be located in one place instead of on a series of floppies. Likewise, restoring can be performed from a single location without the necessity of interchanging a series of floppies.

Software routines are commercially available for performing backups. In fact, manufacturers of backup tape drives and the like often provide routines for use with their hardware. These software routines simplify the process, by guaranteeing backup completion, reducing repetitive inputs and the like. Depending on the hardware and the software, backups can be performed while in an application program or alternatively must be performed at the operating system level. The backup hardware/software combinations available at the time of the present invention all have a common weak link, namely, they require the user to decide to perform a backup and initiate the same. Unless the user makes the decision to backup and then follows through, the backup will not be performed and the risk to programs and data is increased accordingly.

In light of the foregoing, it is an object of the present invention to provide an automatic memory backup system. It is another object of the present invention to provide a backup system which does not require that the user remember to backup, but performs this function on its own. Yet another object of this invention is to provide a system which can be in the form of a hardware add-on or an integral part of modern computers. Still another object of the present invention is to provide a device which is easy to install and use. Still further, it is an object of the present invention to provide a device that is relatively easy to manufacture and which is comparatively economical.

SUMMARY OF THE INVENTION

A device and method for automatically backing up computer memory is provided by the present invention. The device generally consists of a unit which is placed in line between the computer having memory to be backed up and its power source. The device is also placed between the computer and its keyboard. Accordingly, to make the connections the device has power input and output ports, and keyboard input and output ports. Additionally, the device has a CPU including memory which can communicate with the computer through the computer's keyboard port. The CPU also controls a logic gate in the keyboard line and a relay in the power line. In this manner, the CPU can signal the logic gate to disconnect the keyboard from the computer and allow only signals from the device to go to the computer. Moreover, the CPU can instruct the relay to disconnect the computer from its power source to power it down. The device also has switches for canceling the backup operation, and for specifying the type of computer with which the device is being used.

In its operation the device of the present invention effectively functions as a replacement for the on/off switch of the computer. Accordingly, to turn off the computer, the operator turns an "on/off" switch on the device to its "off" position. All the while, the computer's on/off switch remains in the "on" position. The act of moving the devices switch to the "off" position signals the CPU that the backup operation is to begin. The CPU then signals the logic gate to disable the keyboard and to instead allow communication between the device and the computer. The device includes a selector which allows the user to indicate the type of computer with which the device is being used. The position of the selector identifies the computer for the CPU and allows the CPU to retrieve appropriate keycodes from its memory. These keycodes correspond to the type of computer being used, and tell the computer to run a previously stored backup routine. When the keycodes are sent to the computer, the computer locates the backup routine and executes it.

During installation of the software for the operation of the system, the user is able to specify preferences relating to the backup process. More specifically, the user is able to specify a backup schedule and the command or commands required to perform the backup. The commands include, what drives are to be backed up and to where the backups are to be located. The user is also able to specify whether backup accuracy is to be checked, and whether it is possible to perform the desired backup only from an operating system command line or whether backups can be performed while in an application.

Upon execution, the backup routine sends the appropriate commands to perform the specified backup or backups. Once the desired backup is completed, a signal is sent to the device's CPU to de-energize the relay. De-energizing the relay cuts off the power to the computer, in effect turning it off.

As a safety feature, the CPU in the device monitors the elapsed time since sending the backup command to the computer. If the elapsed time exceeds a specified length of time, as might happen if there is a failure in the backup procedure or the computer hardware, the CPU de-energizes the relay without having received the de-energize command from the backup routine. In this manner, if there is a failure, the computer will not be allowed to remain on indefinitely.

In summary, the device, when prompted by an "off" command by the user, will automatically execute a backup prior to powering down the computer.

An alternative embodiment of the device is also set forth which is integrated into the computer itself instead of being an add-on device. This alternative device operates in substantially the same manner as does the add-on device, i.e. the device executes a backup/powerdown routine when prompted by the on/off switch.

The novel features of this invention, as well as the invention itself, both as to its structure and its operation will be best understood from the accompanying drawings, taken in conjunction with the following description, in which similar reference characters refer to similar parts, and in which:

DESCRIPTION OF PREFERRED EMBODIMENTS

Figure 1:
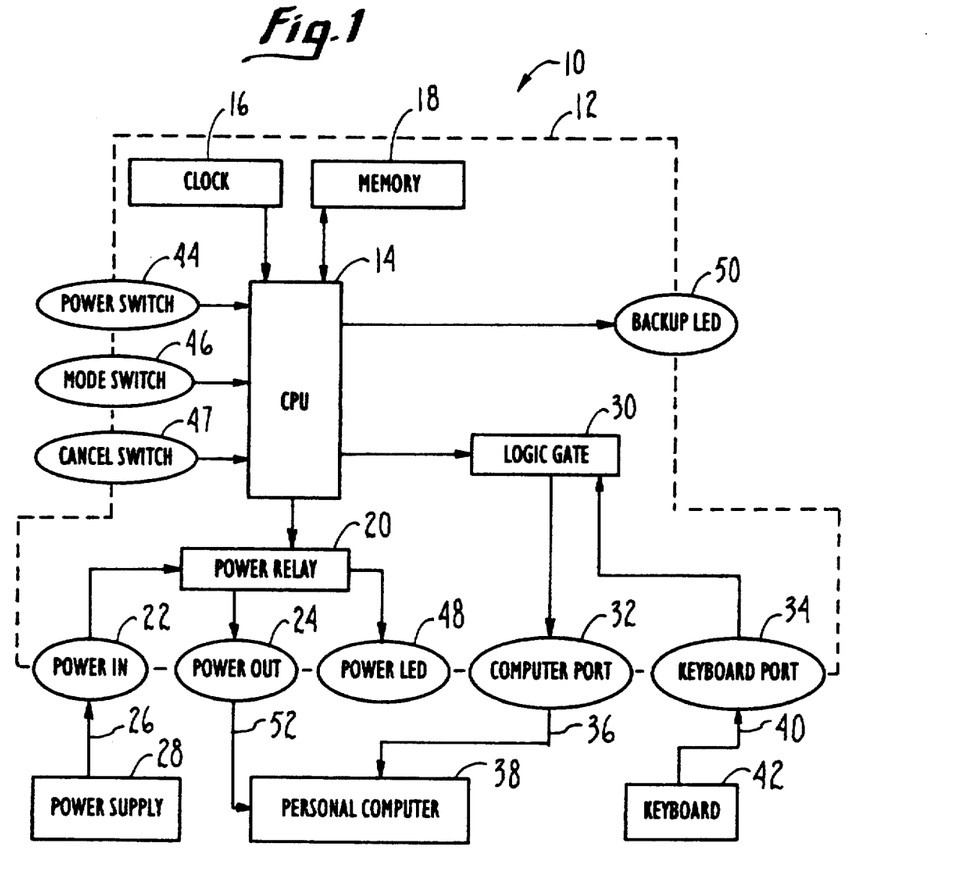
FIG. 1 is a component block diagram of the backup device as a computer add-on device.

Referring initially to FIG. 1, the automatic backup device of the present invention is shown and generally designated 10. The boundary of the device 10 is indicated by the dashed line 12. Components on or inside the dashed line 12 are a part of the device 10. The central component of the device is the central processing unit or CPU 14. Many suitable microprocessors are currently on the market and could be used as CPU 14. One such processor is a MC68HC05J2. CPU 14 has a clock 16 and a memory 18. While these are shown as separate components for purposes of clarity in FIG. 1, they are normally included in microprocessors such as the MC68HC05J2.

Connected to the CPU 14 is an electrical/mechanical relay 20. This relay 20 is placed between a power input port 22 and a power output port 24. Input port 22 is generally a standard three prong electrical plug well known in the industry. Input port 22 is connected to a power cord 26 which is in turn connected to a power source 28 such as a wall outlet. Power output port 24 is a standard three prong outlet capable of accepting a standard three prong plug as is used by computer manufacturers. It is of course possible to use a different type connectors and cables without departing from the invention.

Also connected to the CPU 14 is a logic gate 30. Logic gate 30 is connected in line between a computer port 32 and a keyboard port 34. Computer port 32 is generally a 5 pin DIN if the device 10 is to used with an IBM PC/XT or AT or other compatible computer. Connected to this port is a cable 36 which in turn is connected to the computer 38. Keyboard port 34 is suitable for accepting the keyboard cable 40 of the computer keyboard 42 which is used with computer 38.

Power switch 44 is mounted on the device 10 and is connected to CPU 14. Likewise mode switch 46 and cancel switch 47 are mounted on the device 10 and are connected to the CPU 14. Also included in device 10 is a power indicator light emitting diode or LED 48. Device 10 further includes a backup indicator LED 50 which is connected to an output pin on the CPU 14. The LED's 48 and 50 are helpful during operation although they are not absolutely necessary.

Figure 2:
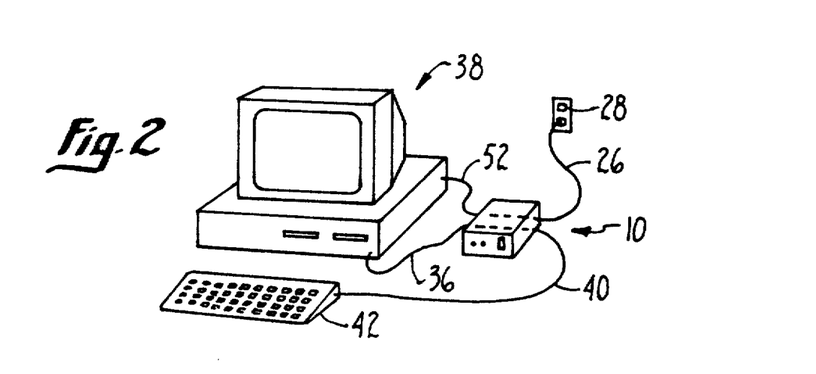
FIG. 2 is perspective view of the backup device attached to a computer.

A completed installation of the device 10 is shown in FIG. 2. The device 10 is shown connected to a wall outlet 28 via power cord 26. Power is transferred from the device to the computer 38 via cable 52. Device 10 is also connected to the keyboard 42 and the computer 38 by cables 36 and 40.

Figure 3:
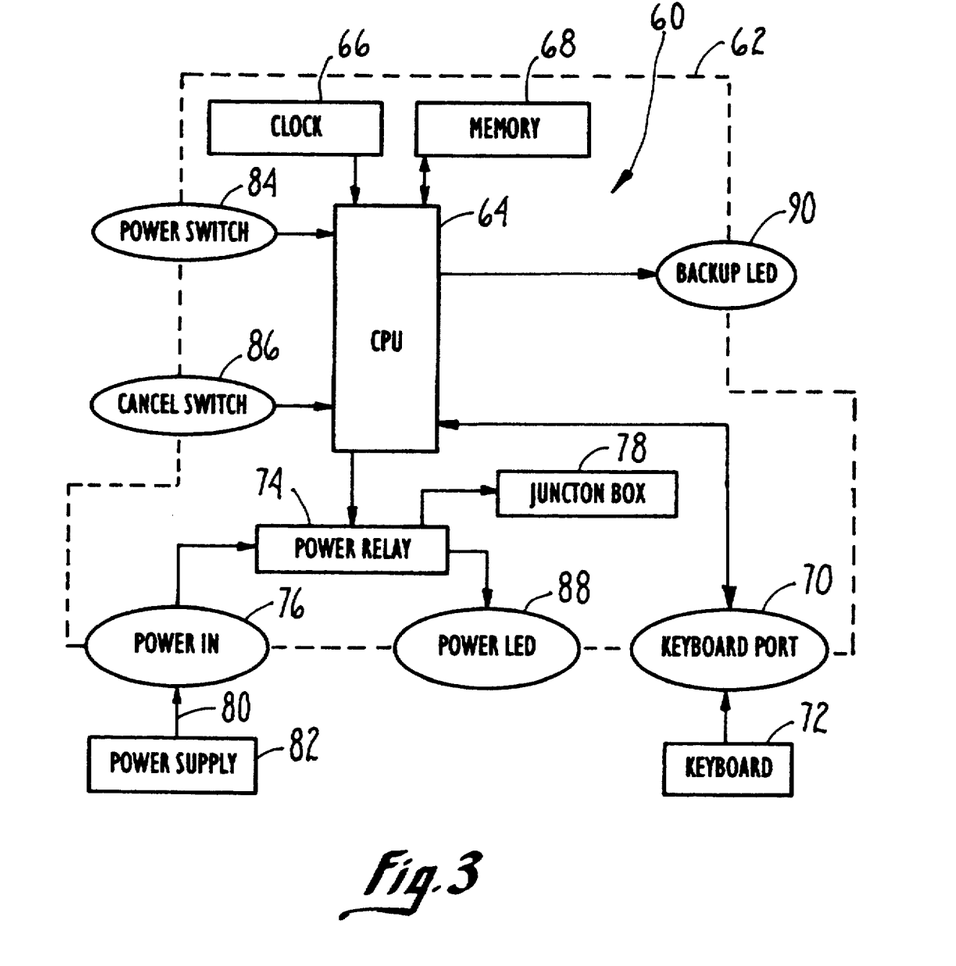
FIG. 3 is a component block diagram of the backup device as an integrated device.

Referring now to FIG. 3, the integrated embodiment of the present invention is shown and designated 60. Unlike device 10 which was a self contained computer add-on, device 60 is integrated into the computer and can even share components with the computer. The computer is shown by dashed line 62. Device 60 uses the CPU 64, clock 66 and chip memory 68 of the computer 62. CPU 64 is connected to a standard keyboard port 70 which accepts the cable from the keyboard 72. A logic gate is not required in the device 60.

Power relay 74 is connected to the CPU 64 and is inline between the power input port 76 and the computer power junction box 78. Input port 76 is the standard input port found on computers and is suitable for connection to a commercial power supply 82 like a wall outlet.

Power switch 84 is mounted on the computer 62 and is connected to CPU 64. Likewise a cancel switch 86 is mounted on the computer 62 and is connected to the CPU 64. Also mounted on computer 62 are a power indicator light emitting diode or LED 88 and a backup indicator LED 90 which is connected to an output pin on the CPU 64. The LED's 88 and 90 are helpful during operation although they are not absolutely necessary.

While the foregoing describes a structure for IBM PC/XT or AT compatables, those skilled in the art will appreciate that the present invention could be used with other computers with minor changes in the cables and connections without departing from the scope of the present invention.

OPERATION

Figure 4:
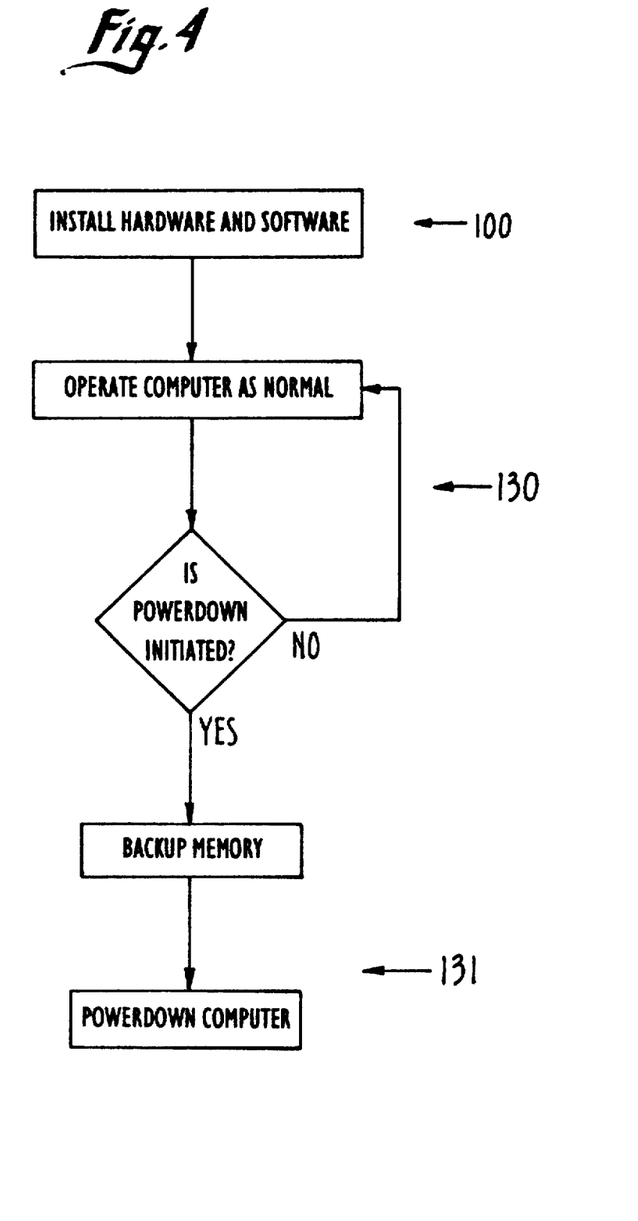
FIG. 4 is an overview block diagram of the automatic backup method.
Figure 5:
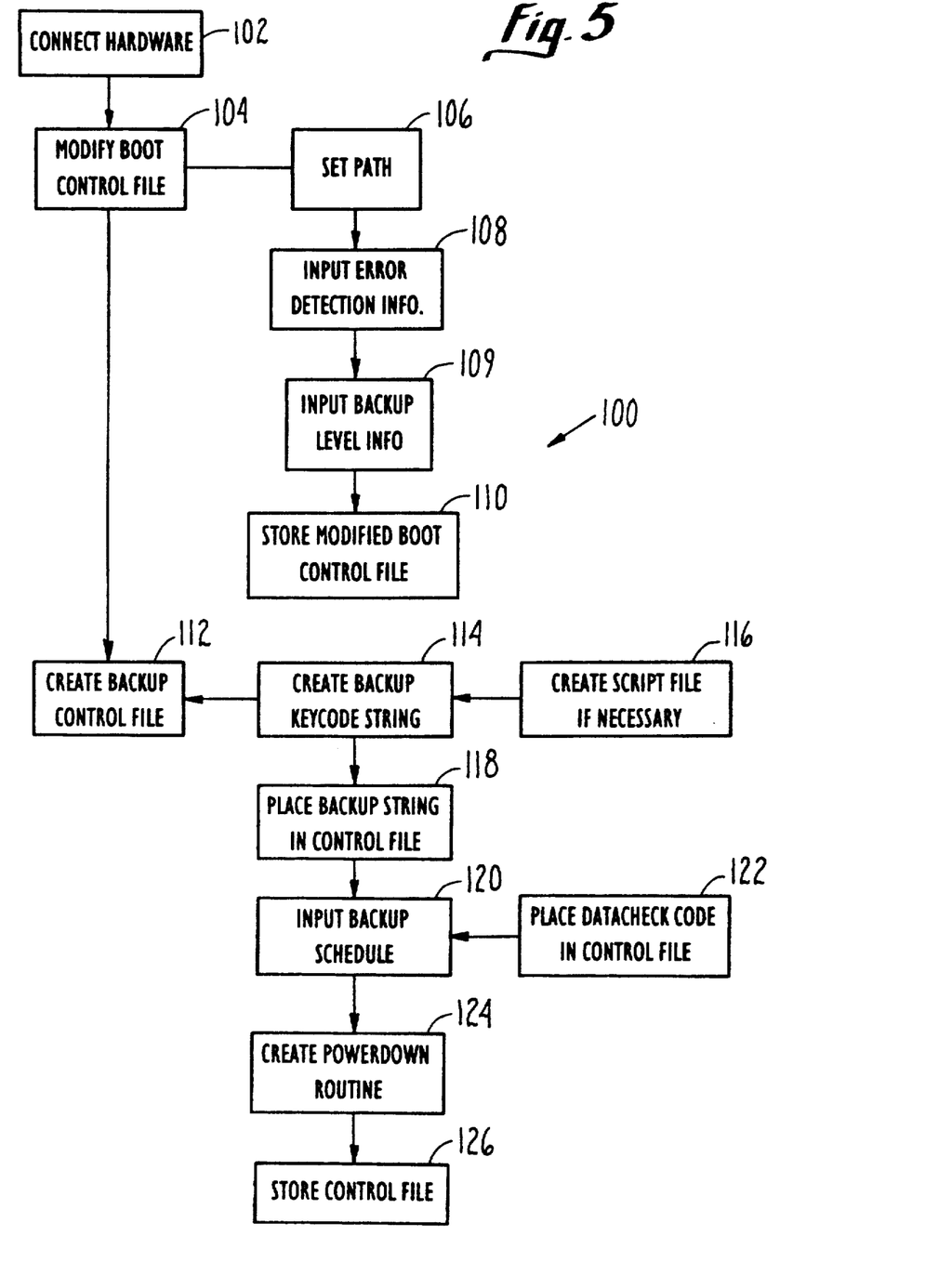
FIG. 5 is a detailed block diagram of the installation portion of the automatic backup method.

Operation of device 10 is generally depicted in FIG. 4 which is an overview flow diagram of the device 10 in operation. The first step is to install the hardware and software required, this step is generally shown and designated 100. The installation step is broken down and shown in more detail in FIG. 5. While FIG. 5 shows hardware installation occurring before software installation, those skilled in the art will appreciate that it is likewise possible to install the software, and then connect the hardware. Once the device 10 is connected as described above and shown in FIG. 2, the appropriate software must be modified or added to the software accessible by the computer 38. This is most easily accomplished by using an installation program which performs the modifications and creations through a question and answer session. This type of installation program is well known in the industry. For the purposes of clarity, the software installation will be discussed in terms of what needs to be modified or created, and it will be appreciated by those skilled in the art that this can be accomplished through the use of an installation program or directly by the user.

Referring to FIG. 5, generally, every computer has what is commonly referred to as a boot control file. This file contains information needed and used by the computer during booting. Booting is the computer operation where operating system software and background programs are loaded into the computer. This boot control file needs to be modified. This step is designated 104. The modification step 104 includes series of substeps. The first step 106 is to set a path for various necessary software such as the backup system software included with a backup device such as tape drive. Another path is required to locate the backup control file. Next, the user can input whether error detection to confirm the accuracy of the backup is desired 108 and added to the boot control file and saved for later use, step 110.

To perform the automatic backups, a backup control file must be created, step 112. For DOS systems, this type of file is commonly referred to as a batch file or a batch program. This is an easily modifiable routine, which, when executed, can perform a number of functions normally performed by the user manually. This creation step 112 begins with creating the appropriate backup keycode string, step 114. Generally, this string will be the same string of characters manually typed by the user to backup the memory. If the backup is not possible from the operating system command line, a sub-routine or script file can be created, step 116. Creating script files are well known in the industry and involve the user performing the series of commands as performed manually. The script file records the commands and the responses in order to enter the same commands at a later time automatically. The resulting keycode string or script file is then added to the backup control file, step 118. The backup schedule, e.g. daily, weekly, 1st and 15th of the month, etc. is inputted by the user, step 120. If the backups are daily, then the backup control file is not modified and the backup will be performed each time the device 10 is powered down. If non-daily backups are selected, datecheck code will be added to the backup control file, step 122. This code will compare the current date to the schedule and continue the backup if the dates match. If the days do not match, then the backup control file initiates the powerdown routine. The next step is to add code which will initiate to actual power down to the backup control file, step 124. This is most easily accomplished by calling and running a previously installed program. This program sends a signal to the CPU in the device 10 indicating the backup is complete and the system is ready for powerdown. The final installation step 126 is to store the backup control file. A representative backup control file backing up two drives to a tape backup on fridays, the first and the fifteenth of the month, with error detection, from the DOS command line is as follows:

```
(1) C:
(2) CD BACKBOX
(3) DEL *.ERR
(4) CHKDATE FRI 1 15
(5) IF ERRORLEVEL 1 GOTO DATEOK
(6) C: BACKBOX POWEROFF
(7) :DATEOK
(8) COPY TIMEOUT.EEE TIMEOUT.ERR
(9) C:
(10) CD TAPE
(11) TAPE BACKUP C: *.*/-A/S/J/-K/B="ERRORC.LOG"/T="BACKUP OF C:"
(12) IF NOT ERRORLEVEL 1 GOTO NEXT1
(13) COPY C: BACKBOX BACKUP.EEE C: BACKBOX BACKUP.ERR
(14) GOTO NEXT2
(15) :NEXT1
(16) TAPE BACKUP D: *.*/S/J/-K/B="ERRORD.LOG"/T="BACKUP OF D:"
(17) IF NOT ERRORLEVEL 1 GOTO NEXT2
(18) COPY C: BACKBOX BACKUP.EEE C: BACKBOX BACKUP.ERR
(19) GOTO NEXT2
(20) :NEXT2
(21) C:
(22) CD BACKBOX
(23) DEL TIMEOUT.ERR
(24) C: BACKBOX POWEROFF
``` whether the backup must be performed from an operating system command line, step 109. This information is The foregoing control file is representative, and as appreciated by those skilled in the art, the functions preformed thereby can likewise be performed by a multitude of other routines without departing from the scope of the present invention.

Referring to FIG. 4, the foregoing installation step designated 100 is performed only once. Should the user elect to change any portion of the backup, i.e. schedule, drive location, etc., the software installation process would need to be performed again.

Having installed the hardware and software as described above, the system operates as normal until the powerdown is initiated by the user. The normal operation until initiation step is designated 130 in FIG. 4.

The automatic backup is initiated by the user whenever the user switches the system off. The system is switched off by the power switch 44 on device 10. The power switch on the computer is left in the "on" position at all times. When the power switch 44 is switched to "off", a signal is sent to the CPU 14 that the backup/powerdown operation is required. As is appreciated by those skilled in the art, the CPU 14 is programmed to perform the functions more fully described below. Programming the CPU 14 is well known in the art. The next series of steps, generally designated 131 in FIG. 4 are more fully shown in FIG. 6.

Figure 6:
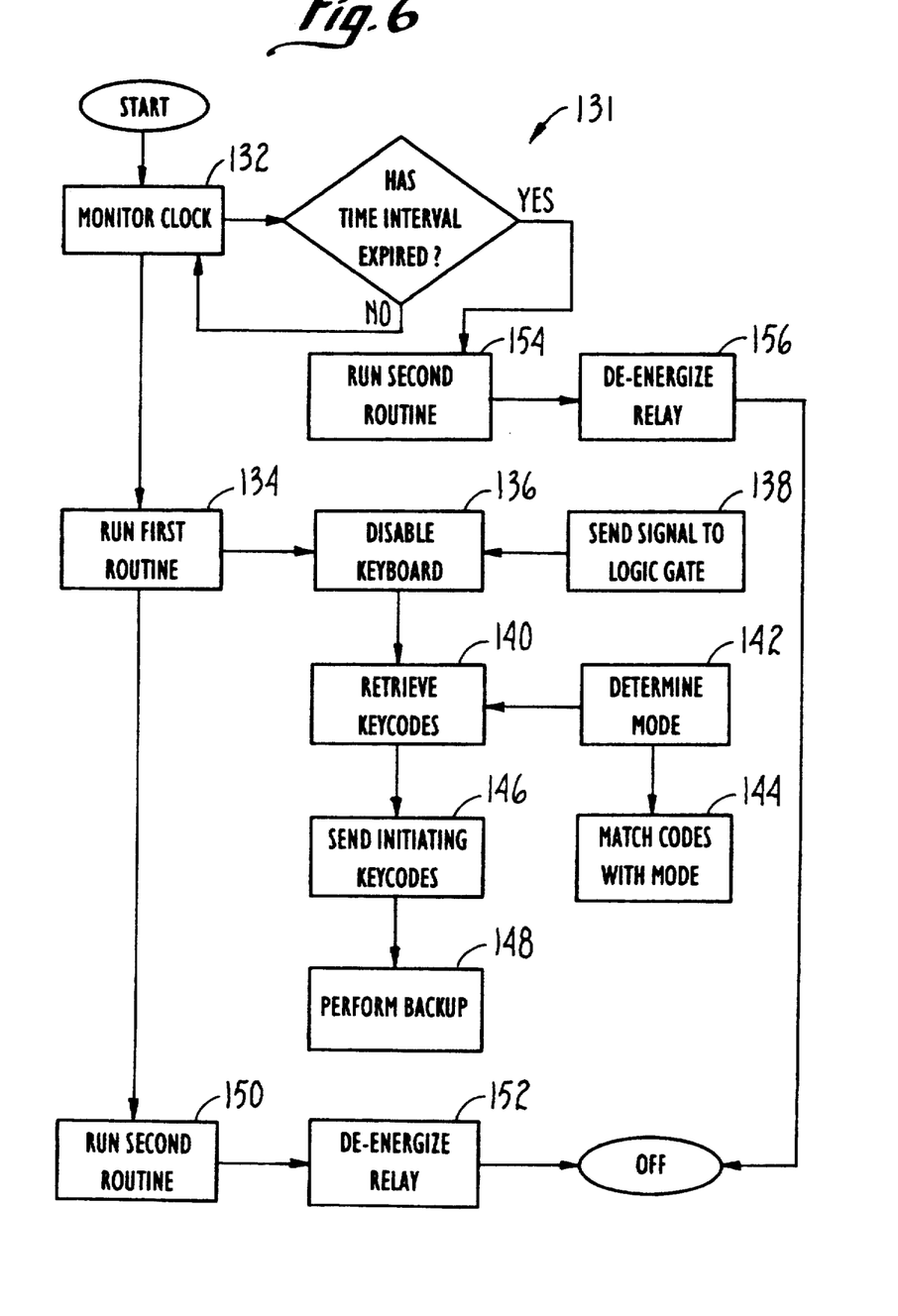
FIG. 6 is a detailed block diagram of the backup/powerdown portion of the automatic backup method.

Referring to FIG. 6, the CPU 14 having received the signal to begin, begins monitoring a clock, generally an internal clock, to see if a specified elapsed time has exceeded, step 132. This is important so that if the backup process is unsuccessful and never signals completion to the CPU 14, the CPU 14 will eventually powerdown the system as described below.

While monitoring the clock, the CPU 14 begins the backup process by running the first routine, namely the backup control file, step 134. To begin the first routine, the CPU disables the keyboard, step 136. This is accomplished by sending a signal to the logic gate 30. Logic gate 30 switches from allowing signals from the keyboard 42 to pass to the computer to allowing signals from the CPU 14 to pass to the computer. The purpose for disconnecting the keyboard 42 is to prevent accidental sending of commands from the keyboard 42 while the Backup/Powerdown is in process. It is, of course, possible to omit disabling the keyboard 42 without departing from the scope of the present invention. Next, the CPU 14 retrieves the initiating keycodes, step 140. To do this the CPU 14 checks to see what mode has been selected by the mode switch 46, step 142. For example, a PC/XT or AT or other compatible computer may be selected. The CPU 14 then selects the appropriate keycode from its memory, step 144 and sends the initiating keycodes to the computer, step 146. The initiating keycodes for use with a DOS PC, are generally "ESC [Enter]" followed by "[Backup Control File Name] [Enter]". This invokes the backup control file created by the installation process described above. The computer now automatically performs the previously specified backup, step 148.

As noted above, the backup control file sends a "backup complete" signal to the CPU 14 upon completion. When the CPU 14 receives this signal, it runs the second routine, step 150, which de-energizes the relay 20, step 152, which powers down the system. Recall that the entire time the first routine is running, the CPU 14 is monitoring the clock. Should the "backup complete" signal not be received prior to expiration of the specified time interval, e.g. three hours, then the CPU 14 runs the second routine none-the-less, step 154, which de-energizes the relay, step 156. Moreover, should the user elect to cancel the backup, the user operates the cancel switch 47 which signals the CPU 14 to interrupt the execution of the backup operation. This signal discontinues the backup operation by immediately de-energizing the relay to powerdown the computer.

The alternative device 60 described above, operates in substantially the same way. The major difference is that there is no need for the keyboard to be disabled and therefore there is no need for the logic gate. Further, if the device 64 uses the CPU 14 of the computer, then all communications previously described as moving from the CPU 14 to the computer, would be intra-chip. As will be appreciated by those skilled in the art, the installation would be substantially the same, but for the absence of the hardware installation as the hardware would be within the computer itself. Generally, the user would move the computer's power switch to "off" which would trigger CPU 64 to send the command to begin execution of the backup control file and begin monitoring of the clock. At the expiration of the time interval, or when the "backup complete" signal is received, the CPU 64 would de-energize the relay, powering down the system.

While the particular automatic backup device and method as herein shown and disclosed in detail are fully capable of obtaining the objects and providing the advantages herein before stated, it is to be understood that it is merely illustrative of the preferred embodiments of the invention and that no limitations ar intended to the details of construction or design herein shown other than as defined in the appended claims.

I claim:

1. A device for automatically backing up information on a first non-volatile memory media of a computer to a second non-volatile memory media upon initiation of powerdown by an operator of the computer, said device comprising:

a power input port;

a power output port connected to said power input port;

a CPU capable of sending initiating instructions to said computer when powerdown is initiated by said operator, said instructions directing said computer to begin running a backup routine capable of selectively backing up said information from said first non-volatile memory media to said second non-volatile memory media;

a memory connected to said CPU, said memory storing said initiating instructions and disconnection instructions;

a clock connected to said CPU;

a means for selectively disconnecting said computer from its power supply, where said means for disconnecting is connected inline between said power input port and said power output port and is further connected to said CPU and where said means for disconnecting disconnects said computer from its power source upon receiving said disconnection instructions from said CPU, said CPU sending said disconnection instructions when confirmation is received that back up to said second non-volatile memory media is complete; and a computer port connected to said CPU.

2. A device as recited in claim 1 which further comprises a means for initiating a backup process where said means for initiating is connected to said CPU.

3. A device as recited in claim 2 which further comprises a means for canceling said backup process where said means for canceling is connected to said CPU.

4. A device as recited in claim 1 which further comprises a means for selecting an operating mode where said means for selecting is connected to said CPU.

5. A device as recited in claim 1 which further comprises a means for switching, where said means for switching is connected to said CPU and where said means for switching controls from where said computer receives its commands.

6. A device as recited in claim 5 wherein said means for switching comprises a logic gate connected to a keyboard and said computer.

7. A device for automatically backing up information on a first non-volatile memory media of a computer to a second non-volatile memory media upon initiation of powerdown by an operator of the computer, said device comprising:
- a means for storing instructions for directing said computer to back up said first non-volatile memory media;
- a means for processing said instructions connected to said means for storing wherein when powerdown is initiated by said operator said means for processing directs said computer to back up said information from said first non-volatile memory media to said second non-volatile memory media;
- a means for initiating powerdown and processing of said instructions connected to said means for processing; and
- a means for selectively disconnecting said computer from its power supply, where said means for disconnecting is connected to and controlled by said means for processing, and said means for processing disconnects said computer from its power supply upon confirmation that back up is complete.

8. A device as recited in claim 7 wherein said means for processing is a CPU.

9. A device as recited in claim 7 wherein said means for initiating processing is a switch connected to said means for processing.

10. A device as recited in claim 7 wherein said means for initiating processing is a keyboard connected to said means for processing.

11. A device as recited in claim 7 which further comprises a means for interrupting processing of said instructions wherein said means for interrupting is connected to said means for processing.

12. A device as recited in claim 7 wherein said means for selectively disconnecting is a relay.

13. A method for automatically backing up non-volatile memory media of a computer when user of said computer initiates powerdown of said computer which comprises the steps of:
A) installing the required hardware and software comprising the sub-steps of:
- connecting a backup device to a computer having non-volatile memory media to be backed up, said back up device having a power input port, a power output port, a CPU, a memory connected to said CPU, a clock connected to said CPU, a relay between said power input port and said power output port, said relay being connected to said CPU, and a computer port for sending instructions to said computer;
- modifying a boot control file of said computer to include a path to a backup memory location where routines to be used during backup of said non-volatile memory media of said computer are stored;
- creating a backup control file able to backup said non-volatile computer memory media when executed by said computer;
- storing said boot control file at a selected location accessible by said computer; and
- storing said backup control file to said backup memory location; then B) maintaining said computer in a normal operation mode; and then C) executing said backup control file when operator of said computer initiates powerdown, wherein said executing step comprises running a first routine and a second routine, said first routine backing up said non-volatile memory media and said second routine disconnecting said computer from a power supply connected to said power input port by de-energizing said relay, said second routine running when running of said first routine is completed.

14. A method as recited in claim 13 wherein said computer includes a keyboard, said memory connected to said CPU includes system specific initiating keycodes and running said first routine further comprises the sub-steps of:
- disabling said keyboard;
- locating and initiating keycodes matching said computer; then
- transferring said initiating keycodes to said computer through said computer port.

15. A method as recited in claim 14 wherein the disabling step further comprises the sub-step of sending a signal from said CPU to a logic gate, where said logic gate enables said computer to receive keycodes from said CPU.

16. A method as recited in claim 14 wherein said locating said initiating keycodes step further comprises the sub-steps of:
- determining what mode has been selected by a operator of said computer; and
- retrieving said initiating keycodes corresponding to said mode selected from said memory connected to said CPU.

17. A method as recited in claim 13 wherein said creating a backup control file step further comprises the sub-steps of:
- creating a backup keycode string capable of backing up said non-volatile memory media to a specified location upon execution by said computer; and
- placing said backup keycode string in said backup control file.

18. A method as recited in claim 13 wherein said creating a backup control file step further comprises the sub-steps of:
- receiving the backup schedule from operator of said computer; and
- placing in said backup control file a datecheck routine for comparing, upon execution by said computer, the execution date with said backup schedule to determine whether to backup or to immediately begin said running of second routine.

19. A method as recited in claim 13 wherein said executing said control file step further comprises the sub-steps of:
- monitoring a clock connected to said CPU; and discontinuing said running of said first routine and said second routine upon expiration of a specified time interval.

20. A method as recited in claim 13 wherein said modifying boot control file step further comprises the sub-steps of:
receiving input from said operator specifying whether backup error detection is desired; and
receiving input from said operator specifying whether capability to backup and power down is desired form a non-operating system command line.

21. A method for automatically backing up non-volatile memory media of a computer when the user of the computer initiates the powerdown of the computer, where the computer has a CPU and a relay connected to said CPU for interrupting power received from a power supply which comprises the steps of:
A) installing the required software comprising the sub-steps of:
modifying a boot control file of said computer to include a path to a backup memory location where routines to be used during backup of said computer memory are stored;
creating a backup control file able to backup said computer memory when executed by said computer;
storing said boot control file at a selected location accessible by said computer; and
storing said backup control file to said backup memory location; then
B) maintaining said computer in a normal operation mode; and then
C) executing said backup control file when operator of said computer initiates powerdown, wherein said executing step comprises running a first routine and a second routine, said first routine backing up said non-volatile memory media and said second routine disconnecting said computer from a power supply connected to said power input port by de-energizing said relay, said second routine running when running of said first routine is completed.

* * * * *